(12) United States Patent
Buesser et al.

(10) Patent No.: US 11,551,123 B2
(45) Date of Patent: Jan. 10, 2023

(54) AUTOMATIC VISUALIZATION AND EXPLANATION OF FEATURE LEARNING OUTPUT FROM A RELATIONAL DATABASE FOR PREDICTIVE MODELLING

(71) Applicant: INTERNATIONAL BUSINESS MACHINES CORPORATION, Armonk, NY (US)

(72) Inventors: Beat Buesser, Dublin (IE); Thanh Lam Hoang, Kildare (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 867 days.

(21) Appl. No.: 16/437,730

(22) Filed: Jun. 11, 2019

(65) Prior Publication Data
US 2020/0394542 A1    Dec. 17, 2020

(51) Int. Cl.
| G06N 5/04 | (2006.01) |
| G06F 16/28 | (2019.01) |
| G06F 40/205 | (2020.01) |
| G06K 9/62 | (2022.01) |
| G06N 20/00 | (2019.01) |
| G06F 16/242 | (2019.01) |

(52) U.S. Cl.
CPC ......... *G06N 5/045* (2013.01); *G06F 16/2423* (2019.01); *G06F 16/287* (2019.01); *G06F 40/205* (2020.01); *G06K 9/6256* (2013.01); *G06K 9/6263* (2013.01); *G06N 20/00* (2019.01)

(58) Field of Classification Search
CPC .... G06N 5/045; G06N 20/00; G06F 16/2423; G06F 16/287; G06F 40/205; G06K 9/6256; G06K 9/6263
USPC ......................................................... 706/46
See application file for complete search history.

(56) References Cited

U.S. PATENT DOCUMENTS

| 5,933,831 A * | 8/1999 | Jorgensen ............. G06F 16/288 |
| 7,185,016 B1 * | 2/2007 | Rasmussen ............ G06F 16/25 |
| 10,719,736 B1 * | 7/2020 | Mehta ................. G06F 16/9024 |
| 11,062,378 B1 * | 7/2021 | Ross ....................... G06N 7/005 |
| 11,328,220 B2 * | 5/2022 | Parker .................... G06N 20/00 |
| 2007/0159481 A1 * | 7/2007 | Abe ....................... G06T 11/206 345/440 |
| 2010/0274785 A1 * | 10/2010 | Procopiuc ............... G06F 16/22 707/E17.046 |

(Continued)

FOREIGN PATENT DOCUMENTS

WO    WO-2018079225 A1 *    5/2018    ......... E21B 17/0423

OTHER PUBLICATIONS

Lam et al., "One button machine for automating feature engineering in relational databases", IBM Research Dublin, Ireland, Jun. 1, 2017, 9 pages. (Year: 2017).*

(Continued)

*Primary Examiner* — Phuong Thao Cao
(74) *Attorney, Agent, or Firm* — Griffiths & Seaton PLLC

(57) ABSTRACT

Embodiments for automatic visualization and explanation of feature learning output for predictive modeling in a computing environment by a processor. A degree of importance score may be assigned to one or more features from a relational database according to the machine learning model. A visualization graph of one or more join paths and the one or more features with the degree of importance score to predict a target variable may be generated.

20 Claims, 9 Drawing Sheets

(56) References Cited

U.S. PATENT DOCUMENTS

| | | | | |
|---|---|---|---|---|
| 2012/0057845 | A1* | 3/2012 | Obana | G11B 27/326 |
| | | | | 386/E5.003 |
| 2012/0226645 | A1* | 9/2012 | O'Rourke | G06Q 40/06 |
| | | | | 706/46 |
| 2013/0046789 | A1* | 2/2013 | Lulewcz | G06F 16/211 |
| | | | | 707/E17.055 |
| 2015/0242761 | A1 | 8/2015 | Amershi et al. | |
| 2017/0132817 | A1* | 5/2017 | Mahajan | G06N 3/105 |
| 2017/0308863 | A1* | 10/2017 | Pitts | G06Q 10/1053 |
| 2018/0203918 | A1 | 7/2018 | Chen et al. | |
| 2018/0203920 | A1* | 7/2018 | Chen | G06F 16/288 |
| 2018/0260726 | A1* | 9/2018 | Takada | G06F 17/18 |
| 2019/0034558 | A1 | 1/2019 | Leeman-Munk et al. | |
| 2019/0095515 | A1* | 3/2019 | Buesser | G06F 16/288 |
| 2019/0303791 | A1* | 10/2019 | Yoshikawa | G06F 30/00 |
| 2019/0370601 | A1* | 12/2019 | Anil Kumar | G06F 16/2465 |
| 2020/0183989 | A1* | 6/2020 | Krogh | G06F 16/908 |
| 2020/0210390 | A1* | 7/2020 | Huang | G06F 16/9566 |
| 2020/0250556 | A1* | 8/2020 | Nourian | G06Q 10/0635 |
| 2021/0027204 | A1* | 1/2021 | Zhang | G06F 17/14 |

OTHER PUBLICATIONS

"Feature Synthesis with Deep Learning for Data Science Challenges" Cong-Nguyen Tran, MSc Artificial Intelligence Track: Machine Learning Jul. 4, 2016 ( 60 Pages).

"One Button Machine for Automating Feature Engineering in Relational Databases" IBM Research Dublin, Ireland Jun. 1, 2017 (9 Pages).

* cited by examiner

AUTOMATIC VISUALIZATION AND EXPLANATION OF FEATURE LEARNING OUTPUT FROM A RELATIONAL DATABASE FOR PREDICTIVE MODELLING

BACKGROUND OF THE INVENTION

Field of the Invention

The present invention relates in general to computing systems, and more particularly to, various embodiments for automatic visualization and explanation of feature learning output for predictive modeling in a computing environment using one or more computing processors.

Description of the Related Art

In today's interconnected and complex society, computers and computer-driven equipment are more commonplace. Processing devices, with the advent and further miniaturization of integrated circuits, have made it possible to be integrated into a wide variety of personal, business, health, home, education, entertainment, travel and other devices. Accordingly, the use of computers, network appliances, and similar data processing devices continue to proliferate throughout society.

SUMMARY OF THE INVENTION

Various embodiments for automatic visualization and explanation of feature learning output for predictive modeling in a computing environment by a processor, are provided. In one embodiment, by way of example only, a method implementing automatic visualization and explanation of feature learning output for predictive modeling in a computing environment, again by a processor, is provided. A degree of importance score may be assigned to one or more features from a relational database according to the machine learning model. A visualization graph of one or more join paths along with the one or more features with the degree of importance score to predict a target variable may be generated.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
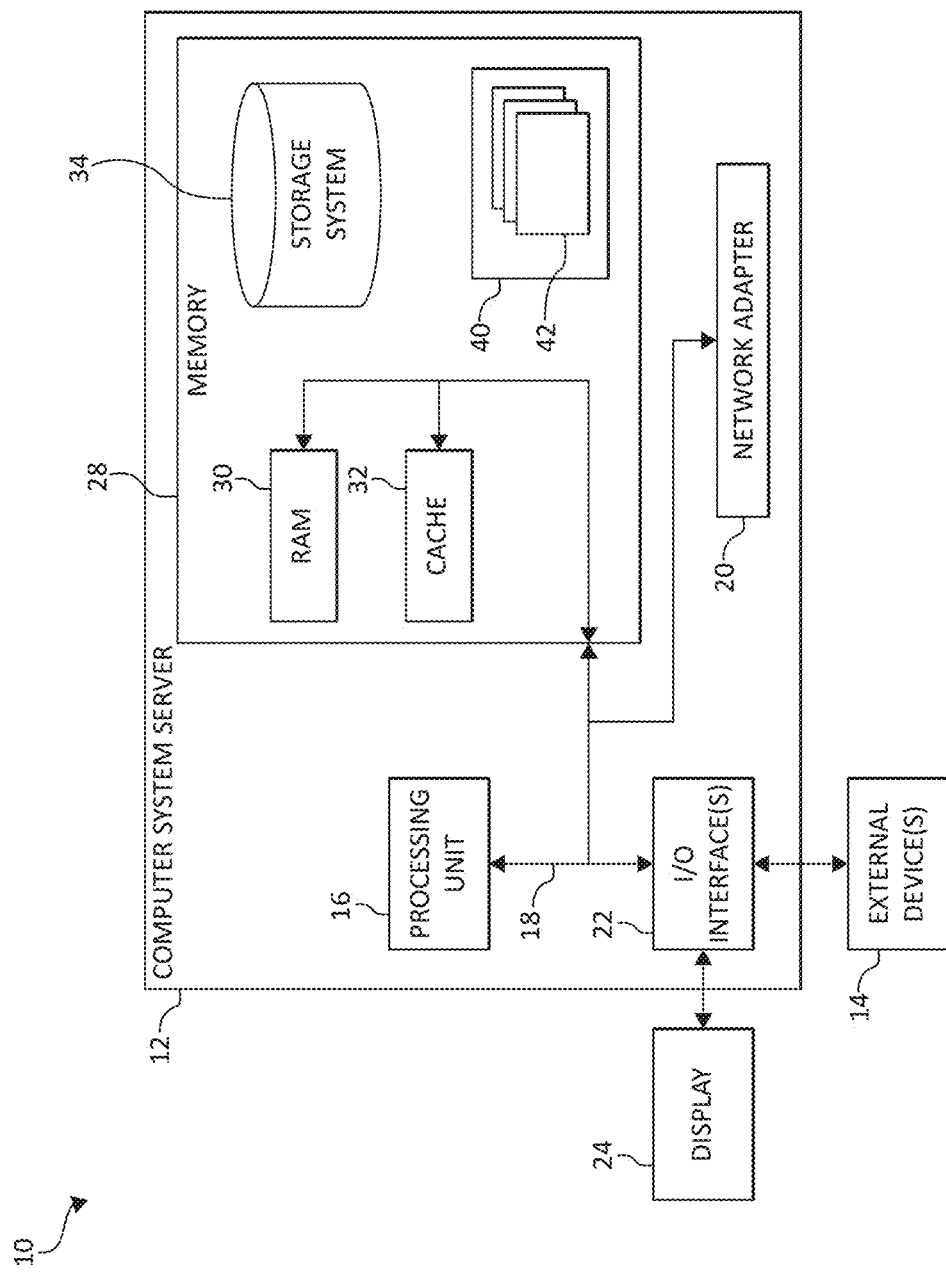
FIG. 1 is a block diagram depicting an exemplary cloud computing node according to an embodiment of the present invention.

Over the last decade, data analytics has become an important trend in many industries including e-commerce, healthcare, manufacture and more. The reasons behind the increasing interest are the availability of data, variety of open-source machine learning tools and powerful computing resources. Nevertheless, machine learning tools for analyzing data are still difficult to use and automate, since a typical data analytics project contains many tasks that have not been fully automated yet. For example, predictive data analytics project have attempted to provide automation tools yet there still remains a need to fully automate the various steps. Feature engineering is one of the most important and time consuming tasks in predictive analytic operations because it prepares inputs to machine learning models, thus deciding how machine learning models will perform. That is, feature engineering is a critical step in data science, which impacts the final prediction results. Feature engineering involves understanding domain knowledge and data exploration to discover relevant hand-crafted features from raw data. Moreover, automating feature engineering on various types of data in a relational database for predictive modeling is extremely challenging.

Accordingly, various embodiments are provided herein for automatic visualization and explanation of feature learning output for predictive modeling in a computing environment. In one embodiment, by way of example only, automatic feature engineering from a relational data may be performed by searching for relevant joining paths ("join paths") in the database graph to join the tables in the database and proper transformations of the joined tables into features. In one aspect, a "join path" may be one of many combinations/sequences of joins among all the tables of the relational database. Moreover, a join path may contain one or more frequently accessed columns from one or more tables. A "Join table" describes a table participating in one or more of these joins. One or more features may be extracted from the relational database with one or multiple tables based on the join paths of the relational database. A machine learning model may be trained using the original features of the database and the newly extracted features. In one aspect, the "Features" may be the values stored in columns of a table in the database (see item 501 in FIG. 5). "Original" may refer to the features/columns that exist in the database before applying any feature engineering to the database. In one aspect, feature engineering systems may, for example, add labels to column names that represent how a feature has been engineered. A feature engineering systems may, for example, refer to a state of the database before feature engineering is applied and use the original column names to filter the "original features". Distinguishing between "original" and "new" features is important, for example, to demonstrate the performance/usefulness of the feature engineering such as, for example, when a machine learning model achieves better performance by using the original and new features instead of just using the original features. It is also important for explaining how the features have been created, e.g. are they original or engineered by a certain join path and transformation combination.

The trained machine learning model may be used to determine a degree of importance score for each feature for the models prediction performance. The degree of importance score may be assigned to one or more features from a relational database according to the machine learning model. The feature importance may be aggregated for each joining paths, each table column and transformation to determine importance of joining paths, table columns and transformations. Said differently, the present invention, in order to understand a predictive analytics model, may assign a degree of importance score (e.g., "feature importance") to one or more features from a relational database to 1) understand a predictive analytic model, and 2) gain insight during the automatic feature engineering process to assist data scientists focus on part of the data that are the most important for a given prediction target. The degree of importance score may measure an amount (which may be represented as a value, a percentage, a range of values, etc.) that a feature contributes to a predictive analytic model. It should be noted that "feature importance" may be a numerical value for each feature (e.g., the columns containing features) that describes how important a feature is for the predictive performance of a machine learning model trained on these features.

Thus, the feature importance (e.g., degree of importance) of features extracted from relational data may be used to identify specific parts of the relational database (e.g., a complex relational data with tables and a database graph) follow the various joining paths, and using which transformations to predict a prediction target so as to reduce time and effort exploring complex databases. Thus, the features may be ranked by a degree of importance score (e.g., "feature importance") measuring how much a feature contributes to a selected machine learning model. The feature importance score can be used to understand those factors that are most important factors that increase the accuracy of predicting a prediction target. In addition to providing model explanation, feature importance scores may be used to gain insight during the feature engineering process may identify those parts of the data that are the most important for a given prediction target.

The present invention provides for visualizing the relational database and the importance of join paths, tables, columns and transformations by generating a visualization and explanation graph. That is, each original and extracted feature may be selected and visualizes the degree of importance value on a corresponding join path. The present invention may create and present explanations provided via a natural language process ("NLP") of the selected features including, for example, feature importance, ORIGIN, applied join path and the transformations that create the features. The "transformations" may, for example, refer to a group of functions that transforms the input feature or aggregations thereof into a new feature (e.g. a function that takes a group of values of one feature and returns the maximum value of that group as a new feature). A visualization graph of one or more join paths along with the one or more features with the degree of importance score to predict a target variable may be generated.

The visualization of feature importance for features extracted from relational data may be provided via an interactive graphical user interface (e.g., for visualization) the importance of the features (e.g., using the degree of importance scores/values) joining paths in the database and indicate those columns in tables where important features are extracted from. Thus, the present invention enables and provides for automatic discovery and visualization of one or more parts of a relational database that are most important or critical to extract information from for predicting their target.

In one embodiment, by way of example only, a first table and a second table are joined based on an edge between the first table and the second table defined by an entity relation diagram (graph) thereby creating a resulting joined table that is connected by a column of data or foreign key relation. The resulting joined table is used as an input into one or more transformations creating one or more new features to predict a target variable.

In one aspect, the entity graph may be a graph where one or more nodes represent tables. Edges may be relational links between the tables. A relational tree may be a tree representation of the joining results (e.g., resulting joined table) following path "p" for any user in a main table. Every path from a root to a leaf node of the relational tree may correspond to a row in the joining results (e.g., resulting joined table) following the path "p" for a corresponding user. A relational tree may be defined for every user "u" per joining path "p", denoted as t(p,u).

In an additional aspect, transformation functions may be learned to create features for predictive modeling applications from a relational database. The database may include at least one main table with training examples and a target variable, and multiple tables that link to the main table and each other via foreign keys. The data in all the tables may include unstructured data: spatio-temporal data, time-series, sequences, item sets, number sets, singleton, texts and images, and simple data such as numerical and categorical. The main table may be joined with other tables to produce joint results for each entity in the main table. The resulting joined table may represent the joint results in the form of relational trees. One or more transformation functions may be used in a supervised learning process to transform relational trees into feature vectors. A set of features may be produced (e.g., output) and can be used as input into a feature selection component or directly to predictive models.

It is understood in advance that although this disclosure includes a detailed description on cloud computing, implementation of the teachings recited herein are not limited to a cloud-computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 12.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
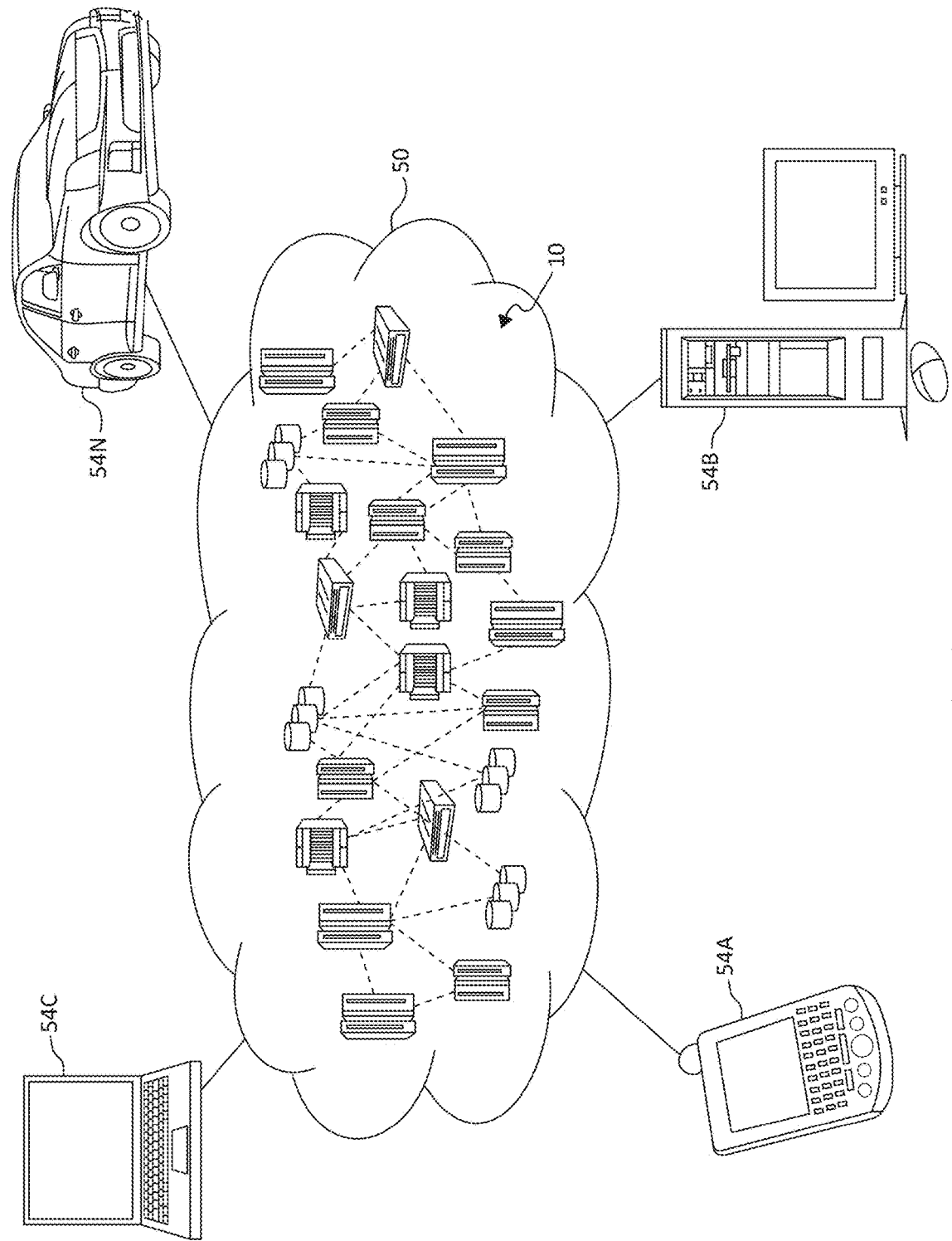
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
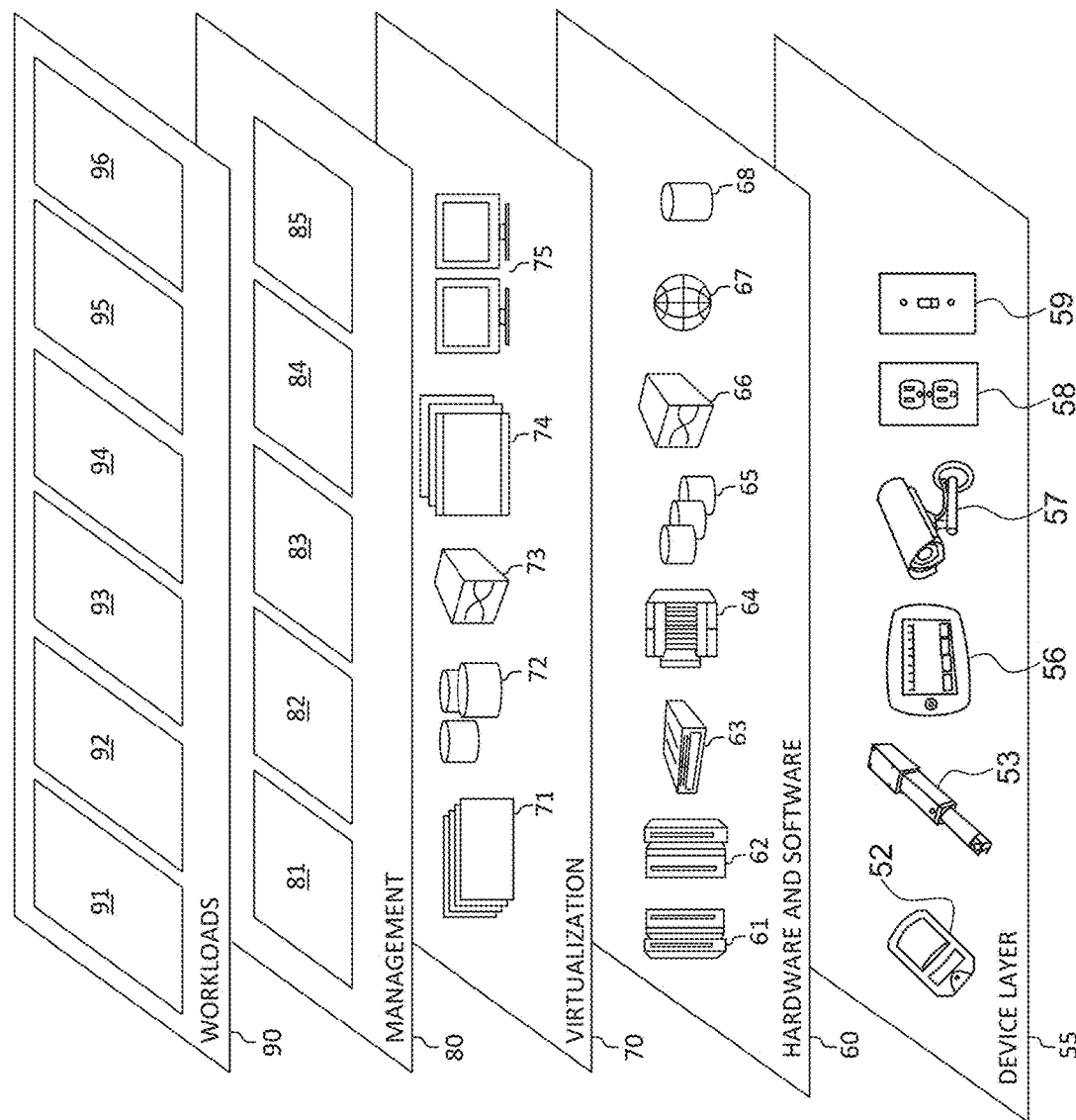
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various automatic feature learning for predictive modeling workloads and functions 96. In addition, automatic feature learning for predictive modeling workloads and functions 96 may include such operations as data analytics, data analysis, and as will be further described, notification functionality. One of ordinary skill in the art will appreciate that the automatic feature learning for predictive modeling workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
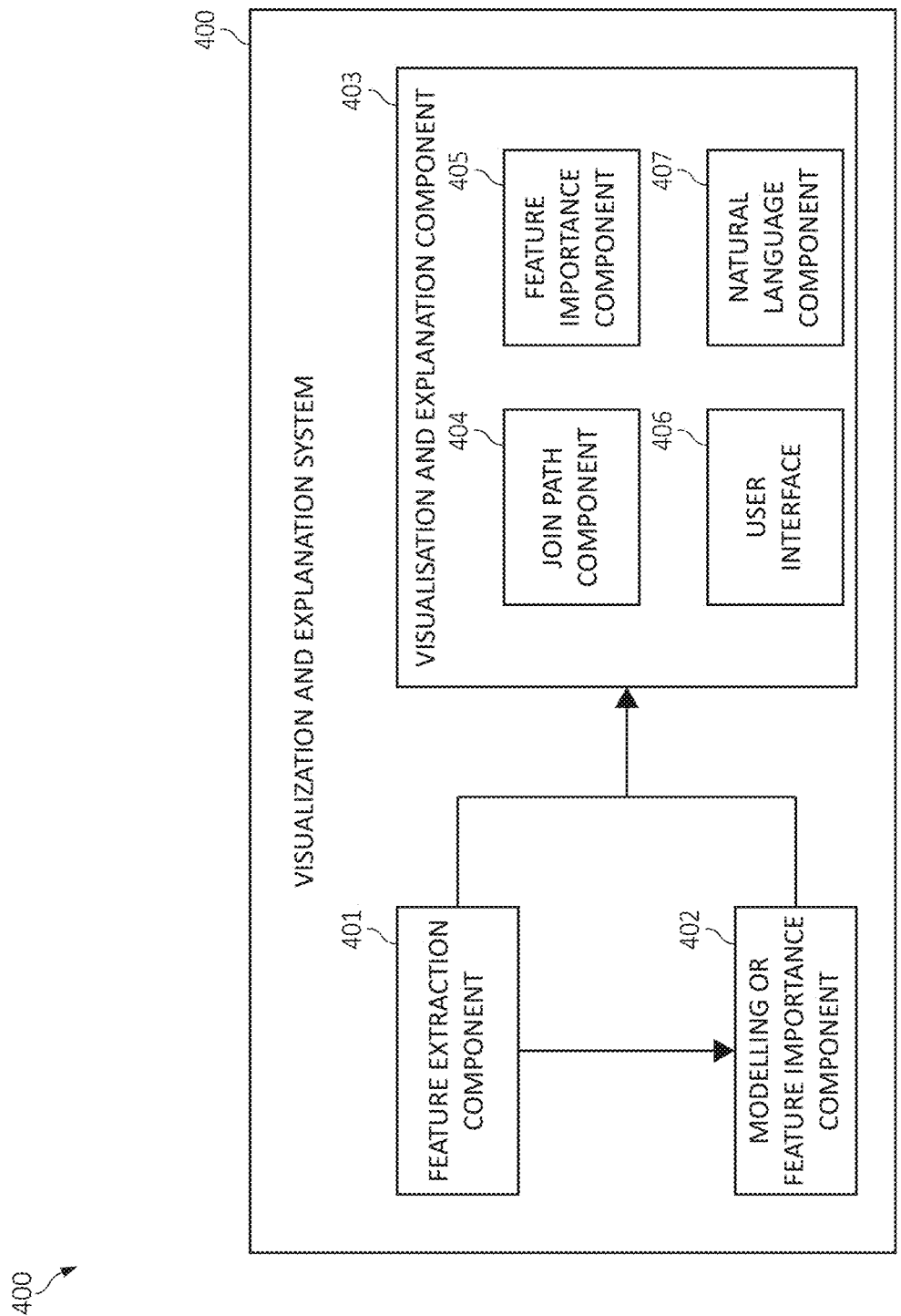
FIG. 4 is an additional block diagram depicting a visualization and explanation system of feature importance according to an embodiment of the present invention.

Turning now to FIG. 4, illustrated is a block diagram of an example, non-limiting visualization and explanation system 400 of in accordance with one or more embodiments described herein. In one aspect, one or more of the components, modules, services, applications, and/or functions described in FIGS. 1-3 may be used in FIG. 4. For example, the visualization and explanation system may be provided by (and/or in association with) the computer system/server 12 of FIG. 1 and/or cloud computing environment 50 of FIG. 2 may be used to perform various computational, data processing and other functionality in accordance with various aspects of the present invention.

The visualization and explanation system 400 may include a feature extraction component 401, a modeling or feature importance component 402, and a visualization and explanation component 403, each of which may be in communication with each other. In one aspect, the visualization and explanation system 400 may include a relational database, which may be in communication with the other components of the visualization and explanation system 400.

The visualization and explanation component 403 may include a join path component 404, a feature importance component 405, a user interface 406 ("UP" such as a graphical user interface "GUI"), and a natural language processing component 407 ("natural language component"), each of which may be in communication with each other.

The feature extraction component 401 may use one or more join paths of a relational database. For instance, in one embodiment, a relational database 410 may include tables showing various information such as, for example, user/consumers' profile information including income, age, location and education as well as tables showing banking transactions, transaction amounts, types of purchased products, location of shops, etc. In order to make predictions using the data in the relational database, a predictive model may use the features as input for the predictive model. In the example described here, features can include elements of the data that are relevant to the desired prediction. For instance, if the predictive model was designed to predict a likelihood of a consumer applying for a credit card, determining which data is most relevant will assist in improving the accuracy of the prediction.

In an additional embodiment, the relational database 410 can include a set of tables containing data fitted into predefined categories. Each table of the relational database 410 (which can be referred to as a "relation") can contain one or more data categories in columns. Each row can contain a unique instance of data for the categories defined by the columns. For example, a typical business order entry database would include a table that described a customer with columns for name, address, phone number, and so forth. Another table would describe an order: product, customer, date, sales price, and so forth. Predictive modeling can make predictions about one or more events using the data in the relational database, but correctly understanding and interpreting relationships between the data is important.

The modeling or feature importance component 402 (and/or in association with the feature importance component 405) may train and manage one or more machine learning models (e.g., gradient boosted trees, deep neural network, etc.) and/or apply statistical operations to determine an importance score for each feature.

In an additional aspect, the modeling or feature importance component 402 may train a machine learning model using original features of the relational database and those newly extracted features. The trained machine learning model may then be used to determine the importance of each feature (via the feature importance component 405) for the models prediction performance (e.g., the importance score output by a gradient boosting model).

The visualization and explanation component 403 may create, generate, and/or prepare a visualization of one or more join paths and feature importance for one or more selected feature. The visualization and explanation component 403 may generate the visualization graph of one or more join paths along with the one or more features with the degree of importance score to predict a target variable. The visualization and explanation component 403 may generate a graph (e.g., an entity graph) based on a relational database (e.g., relational database 410), wherein the graph has a set of nodes that correspond to respective tables in the relational database.

In an embodiment, the visualization and explanation component 403 (in association with the join path component 404) can build an entity graph from the tables in the relational database by incrementally joining the tables at related columns. For instance, if a first table has a set of columns, and a second table has a second set of columns, and a column in the first set of columns is related to another column in the second set of columns, the visualization and explanation component 403 can represent the tables as nodes, and connect the nodes along an edge, the edge representing the relationship between the two tables. In an embodiment, each node in the entity graph carries or represents a table in the relational database, and there can be a root node, which corresponds to a main table where each of the entries of the main table can correspond to an entity which is a subject of the predictive analytics problem. In an embodiment, the visualization and explanation component 403 can receive input indicating what the target variable is and select the root node based on the desired target variable.

In one aspect, the joining of tables and engineering/extracting of new features is only carried out by the feature extraction component 401. The join path component 404 is responsible for loading the join path definitions from the relational database and/or provided by the feature extraction component 401. The join path component 404 is also responsible for analyzing and visualizing the join paths. That is, the join path component 404 may load and analyze each join path of a relational database. A joined path may be joined on two columns, one in each table that contain the same kind of information (where the column may not actually be shared. In one aspect, there may be two columns, one in each table, that contain values describing the same property. The feature extraction component 401 may also extract from the resulting joined table one or more features to predict a target variable. In an embodiment, the join path component 404 may then merge the tables at the related columns and generate a column of data that is merged from a column in the first table and a column in the second table.

The join path component 404 may determine which tables and columns are related based on the edge between the nodes in the entity graph generated by the visualization and explanation component 403 and generate a column of data that is merged from a column in the first table and a column in the second table.

The feature importance component 405 may determine the feature importance of each of the original and extracted features. That is, the feature importance component 405 may determine and assign a degree of importance score to each of the features from the relational database 410 according to the machine learning model.

The UI 406 may provide an output of a visualization and natural language explanation to one or more users.

The natural language processing component 407 may analyze, translate, create, and provide an explanation of one or more of the selected features, the feature's creation (e.g., extraction), and feature importance for the predictive modeling task/operation. In an additional aspect, natural language processing component 407 may perform an artificial intelligence ("AI") operation such as, for example, a natural language processing ("NLP") operation (e.g., a text processor) to analyze, translate, create, and provide an explanation of one or more of the selected features extracted from one or more tables.

In one aspect, the natural language processing component 407 may translates feature extraction rules created and used by the feature extraction component 401 into natural language sentences using prepared sentence patterns. For example, the internal feature extraction rule "[main][products](product_id)(product_id)|price|mean|Double" of the feature extraction component 401 may include at least three sections/parts, each separated for example by the following characters/notations/symbol: [ ], ( ) or | other characters. The first section/part describes the involved tables using [ ] and table names. The second section/part describes the keys used in the join path using ( ) and column names. The third section/part may list the transformations applied to the target variables for example the column names followed by the mathematical transformation and number format separated by, for example, the character "|". This extraction rule may be translated in to natural language using prepared sentence patterns such as, for example, "This feature is created by joining the table main with the table products using the keys "product_id" and "product_id" and calculating the mean of the price column in double format." It should be noted that other extraction rules, containing for example deeper join paths, additional mathematical transformations and number formats may be used with corresponding sentence patterns.

Figure 5:
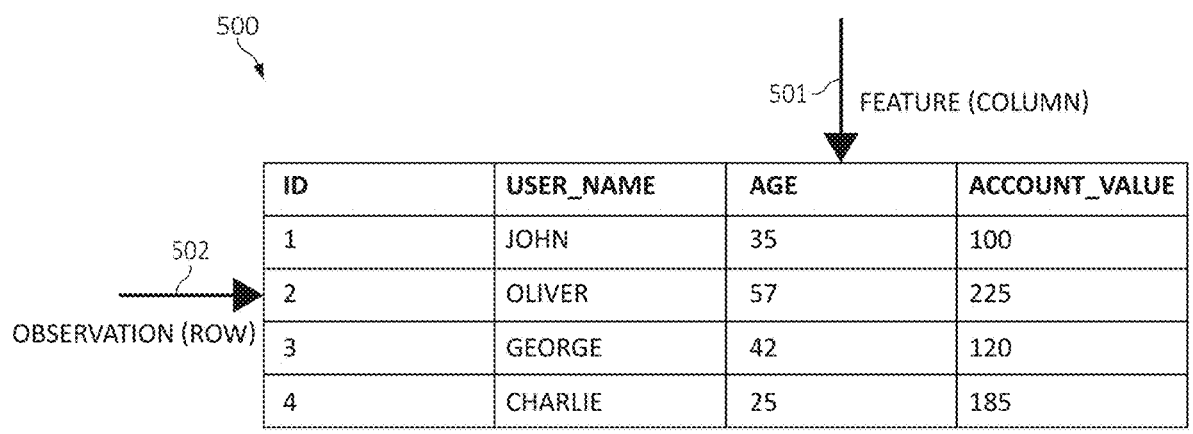
FIG. 5 is a table diagram depicting features and observations according to an embodiment of the present invention.

Turning now to FIG. 5, features and observations are depicted in a database table 500. In one aspect, one or more of the components, modules, services, applications, and/or functions described in FIGS. 1-4 may be used in FIG. 5. Repetitive description of like elements employed in other embodiments described herein is omitted for sake of brevity.

The database table 500 may be a table of a relational database, as described in FIG. 4. A column of the database table 500 in a relational database (e.g., relational database 410 of FIG. 4) may represent a feature 501 (e.g., a user name "User_Name), joining key (e.g., age and account value "Account_Value"), or unique identifier "ID" (e.g., ID 1, 2, 3, 4). A row of the database table 500 in a relational database (e.g., relational database 410 of FIG. 4) may represent an observation 502 or sample of the data.

It should be noted that "joining keys" may refers to either primary or foreign keys. For example, table 500 contains a primary key with column "ID", where each transaction (row) has a unique ID. If the table 500 would contain a column "product_id" (which may contain the same product_id multiple times) referring to which product has been sold in each transaction it could be used to join table 500 with a potential table "products", for example. In this case product_id in table 500 would be a foreign key. However, all columns that are not keys (e.g., primary key or foreign key) are features. It should be noted that the present invention may, for example, when referring to the term "features" means the columns of the joined table resulting from each joining path. Also, it should be noted that "unique ID" may refer to a column that contains only unique values (each value only once) such as, for example, primary keys. Thus, the use of the term "unique ID" may be used interchangeably with "primary key".

Figure 6:
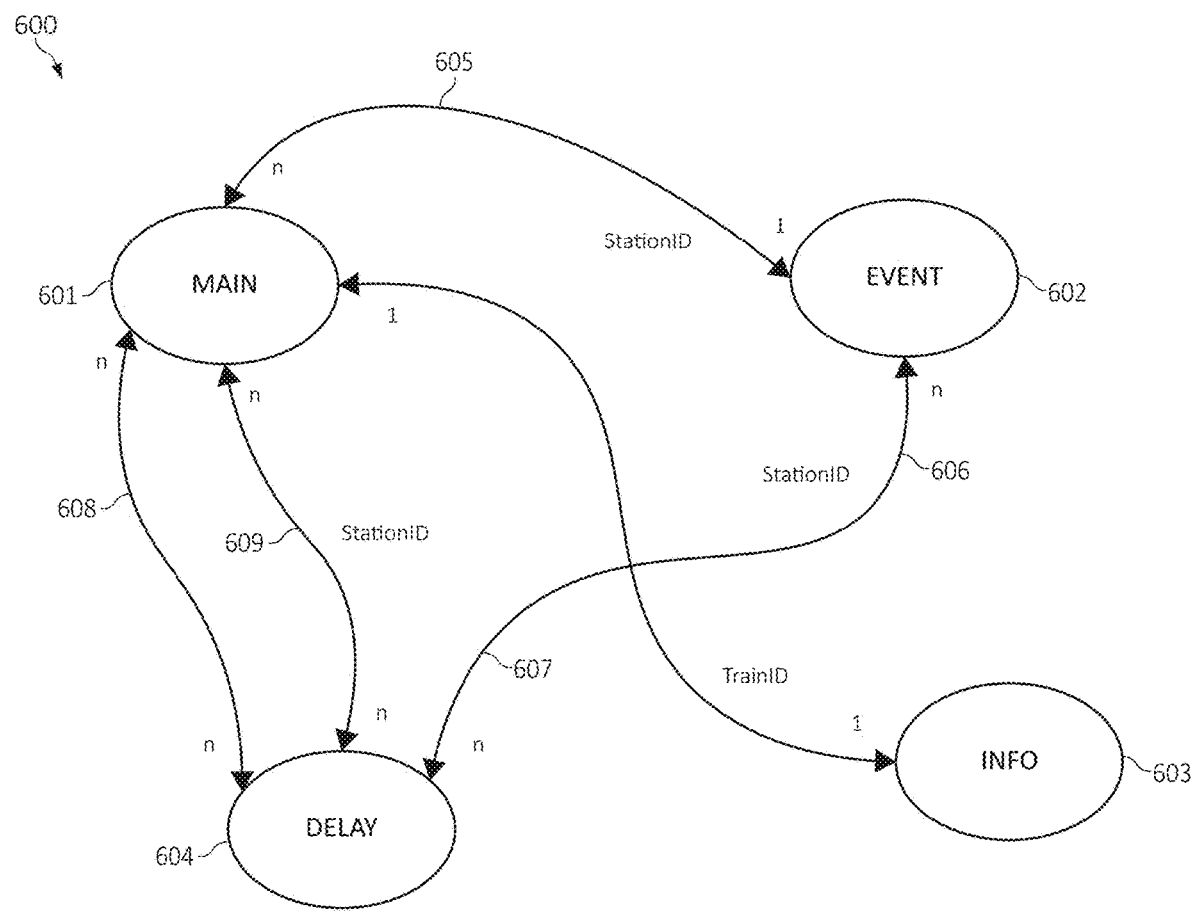
FIG. 6 is an additional block diagram depicting an entity graph where nodes are tables and edges are relational links between tables according to an embodiment of the present invention.

Turning now to FIG. 6, block diagram depicts an entity graph 600 where nodes are tables and edges are relational links between tables. In one aspect, one or more of the components, modules, services, applications, and/or functions described in FIGS. 1-5 may be used in FIG. 6. Repetitive description of like elements employed in other embodiments 2 described herein is omitted for sake of brevity.

In one aspect, the entity graph 600 may include tables and join paths of a relational database. The entity graph 600 may include a first/primary table 601 (e.g., "main" table) of the relational database, a second table 602 (e.g., event table) of the relational database, a third table 603 (e.g., an informational table or "info"), and a fourth table 604 (e.g., a delay table) of the relational database.

The entity graph 600 may have one or more join path sections that may include join path section with key-label and join type description. For example, the entity graph 600 may include join path section 605 with key-label and join type description (between the first table 601 and the second table 602), join path section 606 with key-label and join type description (between the second table 602 and the fourth table 604), join path section 607 with key-label and join type description (between the first table 601 and the third table 603), join path section 608 with key-label and join type description (between the first table 601 and the fourth table 604), and/or join path section 609 with key-label and join type description (between the first table 601 and the fourth table 604).

To further illustrate, consider the following example of the types of tables of a relational database in the entity graph 600. Assume, a relational database has four tables such as, for example, main table (e.g., the first table 601), event table (e.g., the second table 602), info table (e.g., the third table 603), and the delay table (e.g., the fourth table 604). Assume also the main table (e.g., the first table 601) may have a target column, several key columns and optional attribute columns. Each entry in the main table may correspond to an entity that used to train a machine learning model for predicting its target value.

The main table (e.g., the first table 601) may contain information about, for example, arrival times of trains. The target column in the main table (e.g., the first table 601) may be the arrival time. Each entry in the main table (e.g., the first table 601) may be uniquely identified by a message identifier ("MessageID") column corresponding to a message sent by a train upon arrival at a station. The main table (e.g., the first table 601) may have at least two foreign keys: 1) station identifier ("StationID") and train identifier ("TrainID").

The delay table (e.g., the fourth table 604) may contains train delay information similar to the main table but the arrival time may be converted into delay in seconds. The info table (e.g., the third table 603) may include detail information about the type or class of train (e.g., train class.)

The event table (e.g., the second table 602) may include a log of events occurring at a train station where the train is scheduled to arrive. An entity graph (e.g., the entity graph 600) may be a relational graph where nodes are tables and edges are links between tables and provides for feature engineering from a relational database in three main steps: 1) data collection, 2) data transformation, and 3) feature selection.

Figure 7:
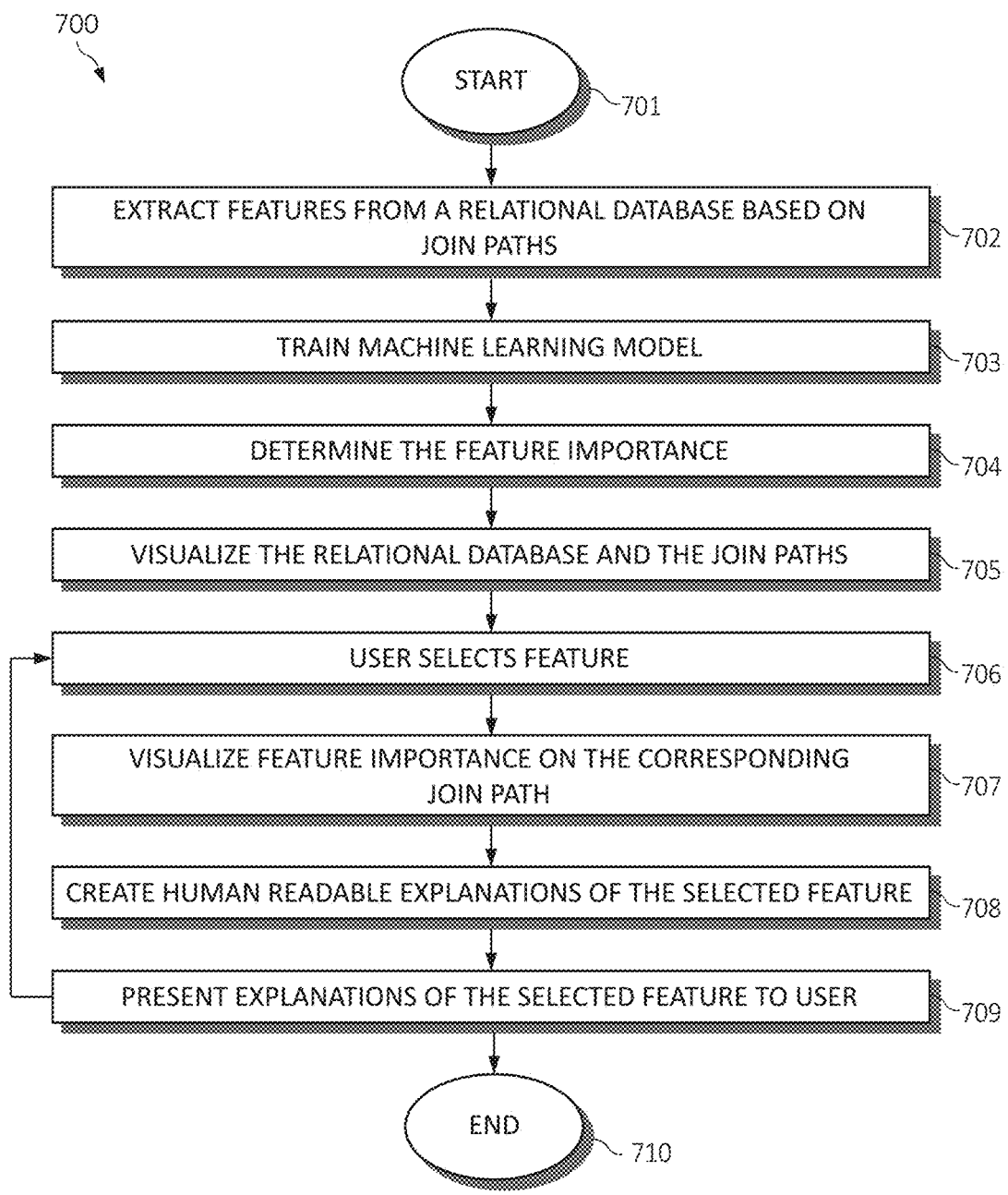
FIG. 7 is a flowchart diagram depicting an exemplary method for implementing automatic visualization and explanation of feature learning output for predictive modeling according to an embodiment of the present invention.

FIG. 7 is a flowchart diagram depicting an exemplary method for implementing automatic visualization and explanation of feature learning output for predictive modeling in a computing environment. In one aspect, each of the devices, components, modules, operations, and/or functions described in FIGS. 1-6 also may apply or perform one or more operations or actions of FIG. 7. The functionality 700 may be implemented as a method executed as instructions on a machine, where the instructions are included on at least one computer readable medium or one non-transitory machine-readable storage medium. The functionality 700 may start in block 701.

One or more features may have been extracted (via the feature extraction component 401 of FIG. 4) from a relational database based on join paths, as in block 702. A machine learning model may be trained, as in block 703. A degree of importance ("feature importance") may be determined, as in block 704. The relational database and join paths may be visualized, as in block 705. One or more features may be selected (e.g., automatically and/or by a user), as in block 706. The degree of importance ("feature importance") on a corresponding join path may be visualized, as in block 707. One or more explanations (e.g., explanations generated, created, and/or translated via an NLP operation) may be created, as in block 708. One or more explanations of the selected feature may be presented/displayed (e.g., displayed via a GUI to a user), as in block 709. In one aspect, the functionality 700 may return to block 706. Alternatively, the functionality 700 may end, as in block 710.

Figure 8:
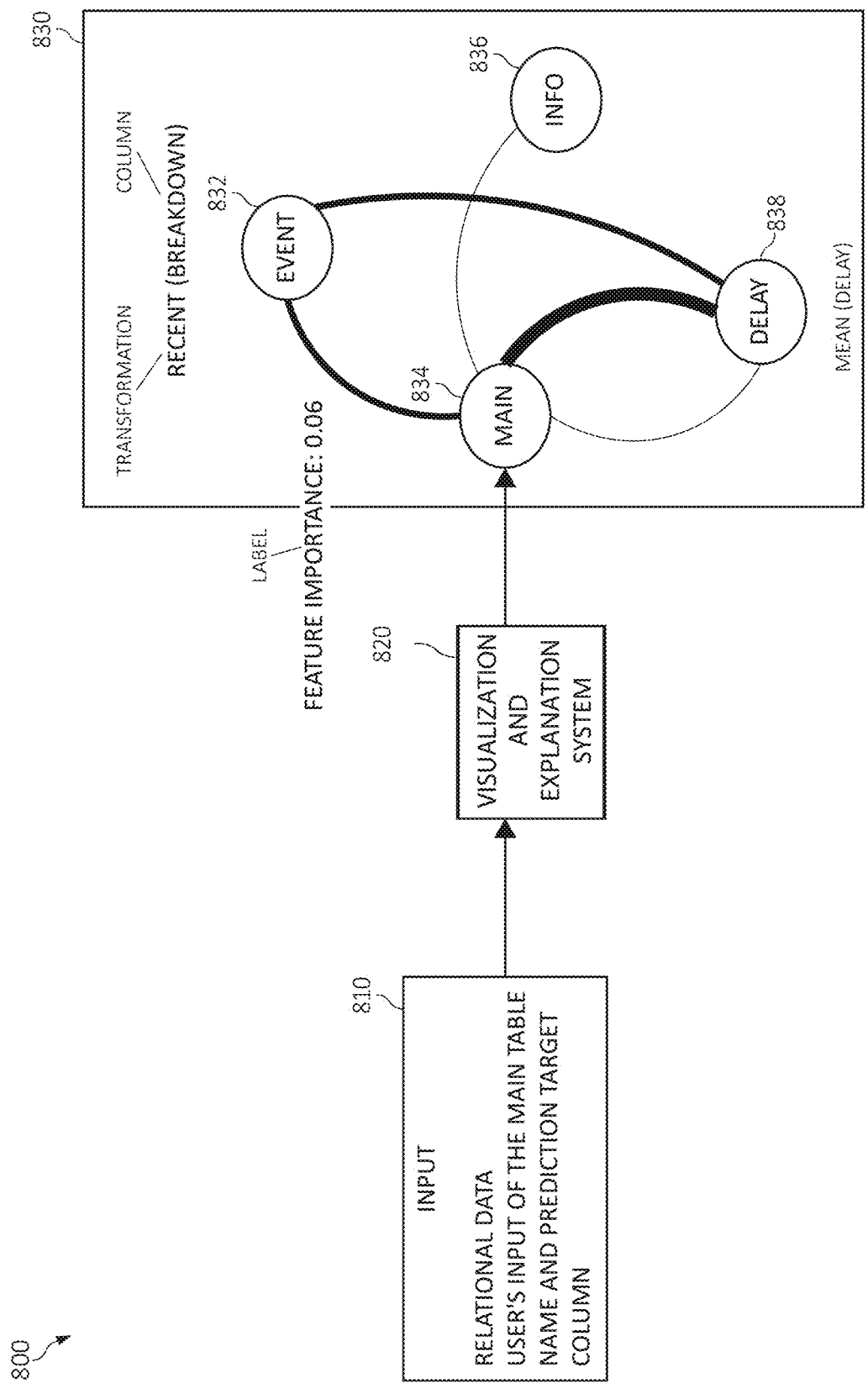
FIG. 8 is a block diagram depicting an exemplary operations for generating a visualization and explanation graph according to an embodiment of the present invention.

Turning now to FIG. 8, block flow diagram depicts an exemplary operations for generating a visualization and explanation graph. In one aspect, one or more of the components, modules, services, applications, and/or functions described in FIGS. 1-7 may be used in FIG. 8. Repetitive description of like elements employed in other embodiments described herein is omitted for sake of brevity.

As shown, the various blocks of functionality are depicted with arrows designating the blocks' 800 relationships with each other and to show process flow. Additionally, descriptive information is also seen relating each of the functional blocks 800. As will be seen, many of the functional blocks may also be considered "modules" of functionality, in the same descriptive sense as has been previously described in FIGS. 1-7. With the foregoing in mind, the module blocks 800 may also be incorporated into various hardware and software components of a system for image enhancement in accordance with the present invention. Many of the functional blocks 800 may execute as background processes on various components, either in distributed computing components, or on the user device, or elsewhere.

Starting with block 810, input data (e.g., relational data) may be collected, gathered, and/or received from a relational database and/or from input from a user. In one aspect, the user's input may be input from a main table name with a prediction target column. In block 820, using the visualization and explanation system 400 of FIG. 4, one or more features from the relational database having one or more tables based on the one or more join paths may be extracted, a degree of importance score (e.g., feature importance score of 0.6) may be assigned/labeled to one or more features from a relational database according to the machine learning model.

A visualization graph (e.g., the entity graph 600 of FIG. 6) of one or more join paths along with the one or more features with the degree of importance score to predict a target variable may be generated as output, as in block 830. That is, the output, from block 830, visualizes the database graph and may emphasize/highlight joining paths (more important paths may have more prominently displayed/wider paths, notations, alerts, or indications on the graph), emphasize/highlight important columns in tables (corresponding to the original features) and transformation that created the newly engineered features such as, for example, a column train break-down in the event table (e.g., the second table 602 of FIG. 6) with the transformation "mean" applied to the list of all values in column "number of boarding passengers" aggregated by all stations ("StationID") visited by the train is a good predictor of the label "train total delay".

Figure 9:
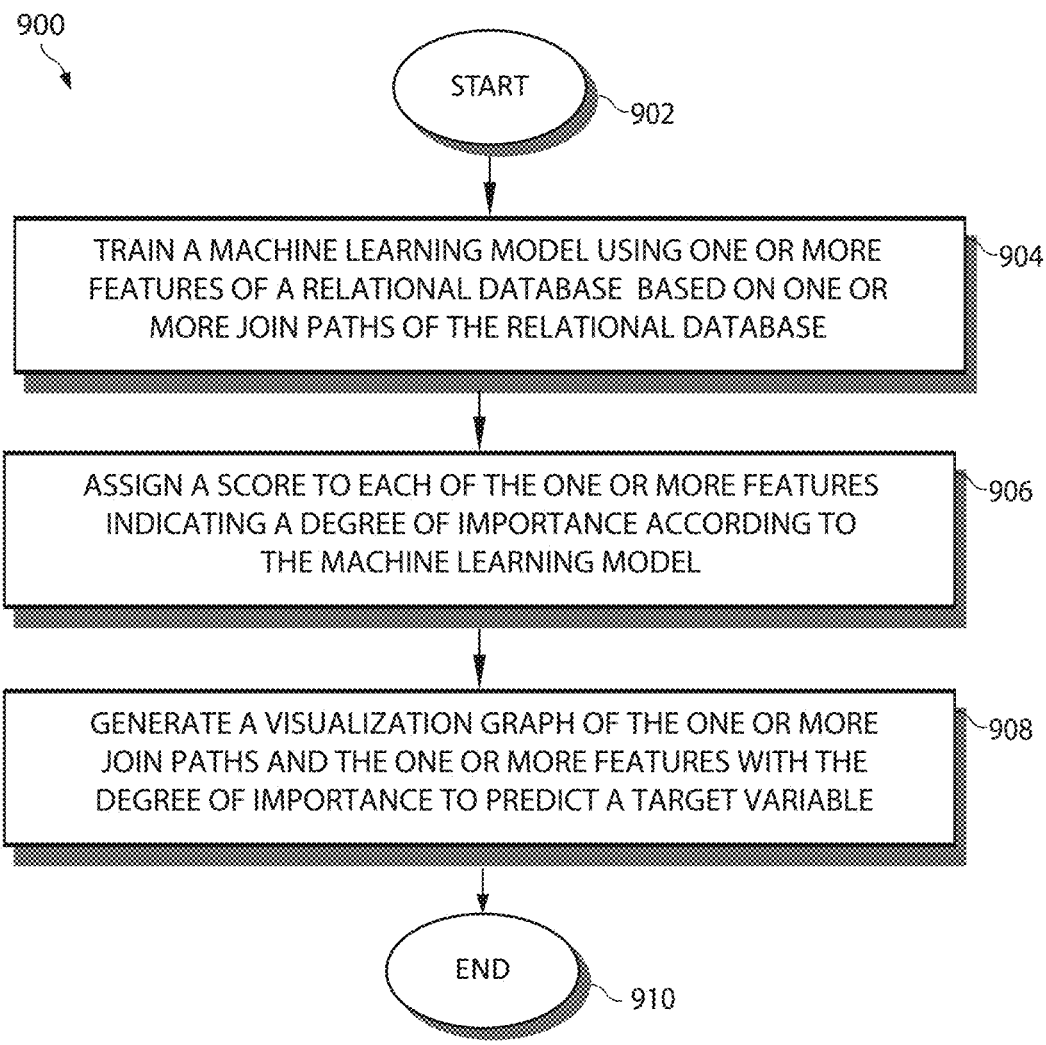
FIG. 9 is a flowchart diagram depicting an additional exemplary method for implementing automatic visualization and explanation of feature learning output for predictive modeling in a computing environment by a processor, again in which aspects of the present invention may be realized.

FIG. 9 is a flowchart diagram depicting an exemplary method for implementing automatic visualization and explanation of feature learning output for predictive modeling in a computing environment. In one aspect, each of the devices, components, modules, operations, and/or functions described in FIGS. 1-8 also may apply or perform one or more operations or actions of FIG. 9. The functionality 900 may be implemented as a method executed as instructions on a machine, where the instructions are included on at least one computer readable medium or one non-transitory machine-readable storage medium. The functionality 900 may start in block 902.

A machine learning model may be trained using one or more features of a relational database based on one or more join paths of the relational database, as in block 904. A score (e.g., a degree of importance score) may be assigned to each of the one or more features indicating a degree of importance according to the machine learning model, as in block 906. A visualization graph of the one or more join paths and the one or more features with the degree of importance may be generated to predict a target variable, as in block 908. That is, the generated visualization graph of one or more join paths along with the one or more features with the degree of importance score may be used to predict a target variable, as in block 906. The functionality 900 may end, as in block 908.

In one aspect, in conjunction with and/or as part of at least one block of FIG. 9, the operations of method 900 may include each of the following. The operations of method 900 may train the machine learning model using the one or more features of the relational database. The operations of method 900 may extract the one or more features from the relational database having one or more tables based on the one or more join paths. The operations of method 900 may aggregate each of the one or more features for the one or more join paths according to the degree of importance score.

The operations of method 900 may provide an explanation of the one or more features by performing a natural language processing (NLP) operation on the one or more features and generate the visualization graph depicting the one or more features with the degree of importance relating to the one or more join paths, table columns, and transformation operations that create the one or more features.

The operations of method 900 may join a first table and a second table based on an edge between the first table and the second table defined by an entity graph, wherein a resulting joined table is connected by a column of data, use the resulting joined table as an input into one or more neural network operations that transform the resulting joined table to the one or more features to predict a target variable, and/or collect the one or more features extracted from the first table and the second table by traversing the entity graph. The operations of method 900 may collect features extracted from the first table and the second table by traversing the entity graph. The operations of method 900 may include generating the entity graph based on a relational database. The entity graph may be traversed to a depth based on a selected criterion. For example, the selected criterion may include, but not limited to, searching the entity graph to a depth based on selected criterion relating to processing efficiency or as a function of the processing resources required to traverse the entity graph and collect data. If the amount of computer resources consumed surpasses a predetermined threshold, the entity graph search operation may cease traversing the entity graph. In other embodiments, a user may provide input data indicating a desired depth with which to traverse the entity graph. For example, the entity graph traversing operation may start at a root node or main table and traverse the entity graph to a predetermined depth specified in the input received from the user. As an additional example, the entity graph may be traversed until reaching one or more feature nodes based on relevance to a target variable associated with a main table or root node or of the entity graph.

The operations of method 900 may define the one or more neural network operations as one or more relational neural network operations and an embedded neural network operation in an embedded layer associated with the resulting joined table. The operations of method 900 may input numerical data of the resulting joined table into the one or more relational neural network operations that transform the numerical data to one or more features to predict the target variable.

In an additional aspect, the operations of method 900 may input unstructured data of the resulting joined table into the embedded layer associated with the resulting joined table. Unstructured data may be from a group consisting of spatial-temporal data, time-series data, sequence data, item set data, number set data, singleton data, text data and image data, transform the unstructured data into numerical data using the embedded neural network operation in the embedded layer associated, and input the numerical data transformed by the embedded neural network operation into the one or more relational neural network operations that transform the numerical data to one or more features to predict the target variable. Numerical data may be input, according to a hierarchical order of the resulting joined table, into the one or more relational neural network operations that transform the numerical data to one or more features to predict the target variable.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method, by a processor, for implementing automatic visualization and explanation of feature learning output for predictive modelling in a computing environment, comprising:
    assigning a degree of importance score to one or more features from a relational database according to a machine learning model, wherein the machine learning model is trained with original features of the relational database, and extracts and assigns the degree of importance score to the one or more features comprising newly extracted features subsequent to the training; and
    generating a visualization graph of one or more join paths and the one or more features with the degree of importance score to predict a target variable.

2. The method of claim 1, further including training the machine learning model using the one or more features of the relational database.

3. The method of claim 1, further including extracting the one or more features from the relational database having one or more tables based on the one or more join paths.

4. The method of claim 1, further including aggregating each of the one or more features for the one or more join paths according to the degree of importance score.

5. The method of claim 1, further including providing an explanation of the one or more features by performing a natural language processing (NLP) operation on the one or more features.

6. The method of claim 1, further including generating the visualization graph depicting the one or more features with the degree of importance relating to the one or more join paths, table columns, and transformation operations that create the one or more features.

7. The method of claim 1, further including:
    joining a first table and a second table based on an edge between the first table and the second table defined by an entity graph, wherein a resulting joined table is connected by a column of data, wherein the entity graph is traversed to a depth based on a selected criterion;
    using the resulting joined table as an input into one or more neural network operations that transform the resulting joined table to the one or more features to predict the target variable; and
    collecting the one or more features extracted from the first table and the second table by traversing the entity graph.

8. A system for implementing automatic visualization and explanation of feature learning output for predictive modelling in a computing environment, comprising:
    one or more computers with executable instructions that when executed cause the system to:
        assign a degree of importance score to one or more features from a relational database according to a machine learning model, wherein the machine learning model is trained with original features of the relational database, and extracts and assigns the degree of importance score to the one or more features comprising newly extracted features subsequent to the training; and
        generate a visualization graph of one or more join paths and the one or more features with the degree of importance score to predict a target variable.

9. The system of claim 8, wherein the executable instructions that when executed cause the system to train the machine learning model using the one or more features of the relational database.

10. The system of claim 8, wherein the executable instructions that when executed cause the system to extract the one or more features from the relational database having one or more tables based on the one or more join paths.

11. The system of claim 8, wherein the executable instructions that when executed cause the system to aggregate each of the one or more features for the one or more join paths according to the degree of importance score.

12. The system of claim 8, wherein the executable instructions that when executed cause the system to provide an explanation of the one or more features by performing a natural language processing (NLP) operation on the one or more features.

13. The system of claim 8, wherein the executable instructions that when executed cause the system to generate the visualization graph depicting the one or more features with the degree of importance relating to the one or more join paths, table columns, and transformation operations that create the one or more features.

14. The system of claim 8, wherein the executable instructions that when executed cause the system to:
join a first table and a second table based on an edge between the first table and the second table defined by an entity graph, wherein a resulting joined table is connected by a column of data, wherein the entity graph is traversed to a depth based on a selected criterion;
use the resulting joined table as an input into one or more neural network operations that transform the resulting joined table to the one or more features to predict the target variable; and
collect the one or more features extracted from the first table and the second table by traversing the entity graph.

15. A computer program product for, by a processor, implementing automatic visualization and explanation of feature learning output for predictive modelling in a computing environment, the computer program product comprising a non-transitory computer-readable storage medium having computer-readable program code portions stored therein, the computer-readable program code portions comprising:
an executable portion that assigns a degree of importance score to one or more features from a relational database according to a machine learning model, wherein the machine learning model is trained with original features of the relational database, and extracts and assigns the degree of importance score to the one or more features comprising newly extracted features subsequent to the training; and
an executable portion that generates a visualization graph of one or more join paths and the one or more features with the degree of importance score to predict a target variable.

16. The computer program product of claim 15, further including an executable portion that trains the machine learning model using the one or more features of the relational database.

17. The computer program product of claim 15, further including an executable portion that:
extracts the one or more features from the relational database having one or more tables based on the one or more join paths; and
aggregates each of the one or more features for the one or more join paths according to the degree of importance score.

18. The computer program product of claim 15, further including an executable portion that provides an explanation of the one or more features by performing a natural language processing (NLP) operation on the one or more features.

19. The computer program product of claim 15, further including an executable portion that generates the visualization graph depicting the one or more features with the degree of importance relating to the one or more join paths, table columns, and transformation operations that create the one or more features.

20. The computer program product of claim 15, further including an executable portion that:
joins a first table and a second table based on an edge between the first table and the second table defined by an entity graph, wherein a resulting joined table is connected by a column of data, wherein the entity graph is traversed to a depth based on a selected criterion;
uses the resulting joined table as an input into one or more neural network operations that transform the resulting joined table to the one or more features to predict the target variable; and
collects the one or more features extracted from the first table and the second table by traversing the entity graph.

* * * * *